(No Model.)  3 Sheets—Sheet 3.
W. F. WEIRICK.
HARVESTER.
No. 326,817. Patented Sept. 22, 1885.
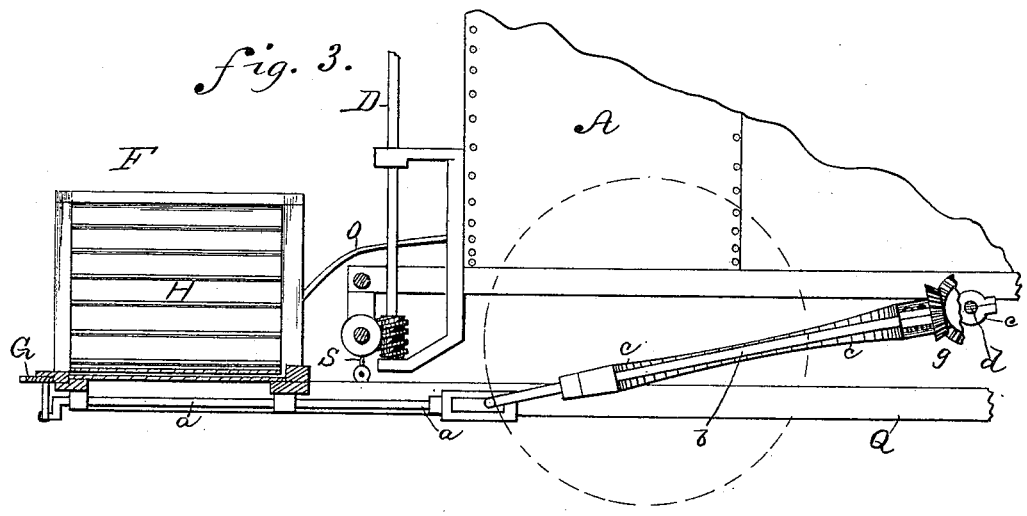
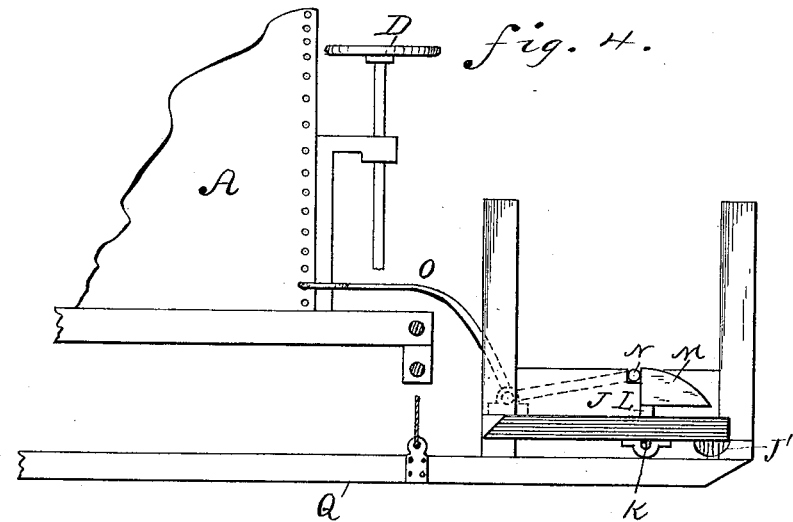
WITNESSES:  INVENTOR:
H. B. Brown  Wm. F. Weirick
W. X. Stevens  BY Munn & Co
 ATTORNEYS.

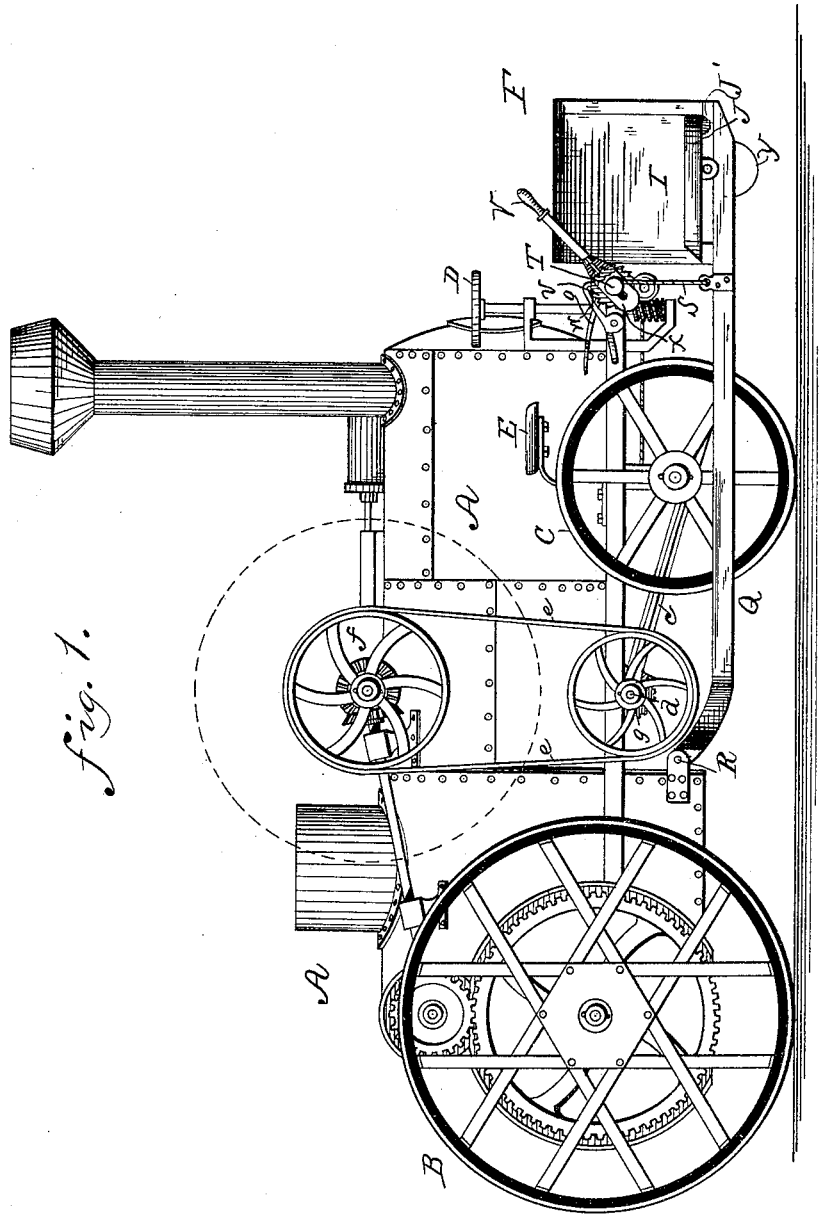

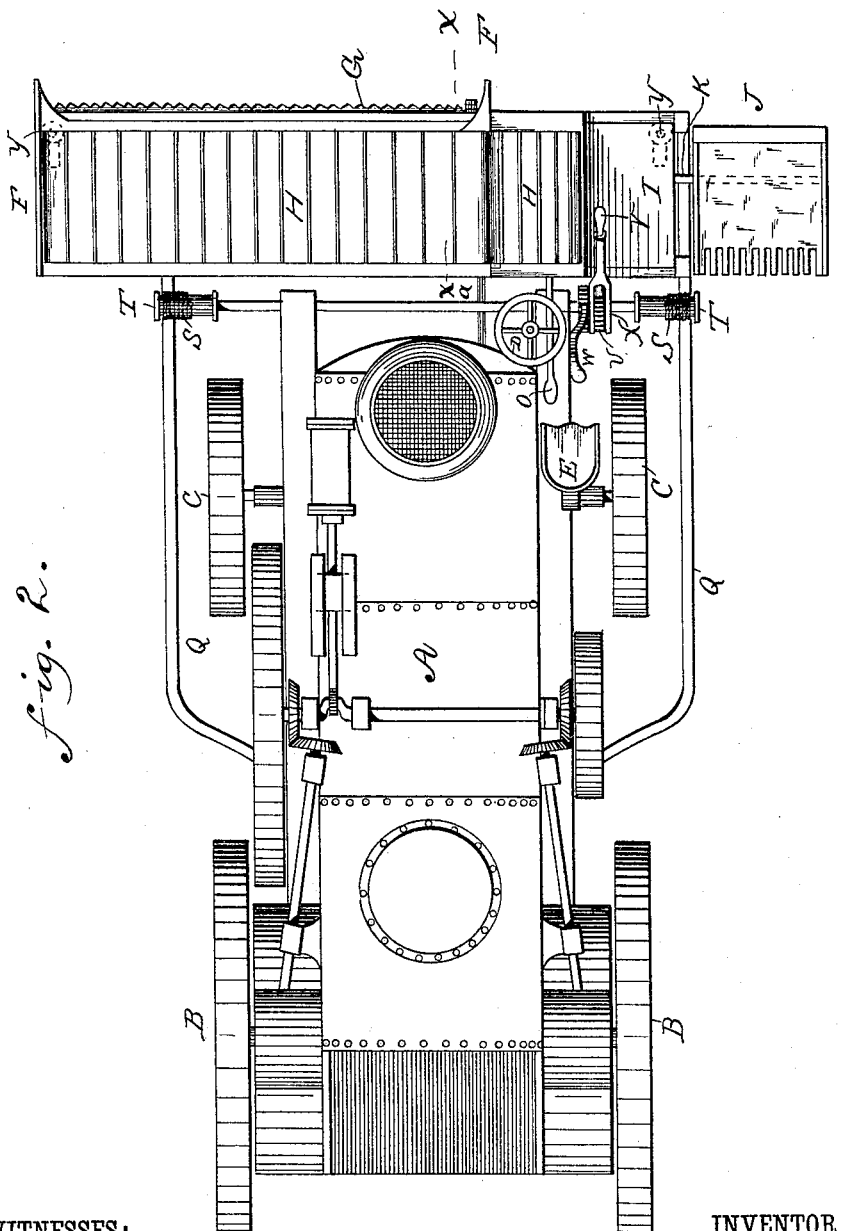

UNITED STATES PATENT OFFICE.

WILLIAM F. WEIRICK, OF CHARLESTOWN, WEST VIRGINIA.

HARVESTER.

SPECIFICATION forming part of Letters Patent No. 326,817, dated September 22, 1885.

Application filed January 16, 1884. (No model.)

*To all whom it may concern:*

Be it known that I, WILLIAM F. WEIRICK, a citizen of the United States, residing at Charlestown, in the county of Jefferson, State of West Virginia, have invented a new and useful Improvement in Harvesters, of which the following is a full, clear, and exact description.

This invention relates to that class of harvesters provided with automatic rakes and binders; and it has for its object to provide means whereby a harvester may be carried bodily upon and be propelled by an engine.

To this end my invention consists in a harvester hung on an engine and driven thereby, and means whereby the engine-driver may drop the bundles of grain which have been cut and bound by the harvester, as hereinafter described and claimed, reference being had to the accompanying drawings, in which—

Figure 1 is a side elevation of a traction-engine and harvester, showing my invention. Fig. 2 is a plan view of the same. Fig. 3 is a vertical section at *x x*, Fig. 2; and Fig. 4 is a side elevation with intervening parts removed to show my bundle carrying and dropping device.

A represents the engine, which may be of any form adapted to run itself over the ground; but I prefer to have the large drive-wheels B behind and the smaller guide-wheels forward. These guide-wheels are directed by the driver by means of the hand-wheel D and its connections.

E represents the driver's seat.

F represents a harvester having a sickle, G, an automatic rake or apron, H, and a binder, all of which may be of any common form.

The binder, which is not shown in the drawings, it being removed to show my bundle carrier and dropper, will be located at I, so that the grain received upon the automatic rake or apron H will be first bound and then, instead of being dropped upon the ground in single scattered bundles, the bundles dropped by the binder will be caught by my carrier J, which consists of a three-sided box hung upon a rock-shaft, K, which is automatically held upright by means of an arm, L, having an arc, M, attached to shaft K, and a latch, N, acting against said arm. The latch falls into action by its own weight, and it is provided with an opposite arm, O, shaped as a foot-treadle for the driver to press when he wishes to drop a lot of bundles. The carrier J is secured at one side of its center to shaft K, the portion of the carrier to the rear of the shaft being greater than the portion forward, so that a load of bundles upon it will tend to tip it to the rear; but the carrier is weighted at J' on its short or front side, so that when empty it will assume and maintain its upright position. The arc M prevents the latch from falling behind the arm L when the latch is raised and the arm is tipped back. When enough bundles have been gathered on the carrier J, the driver presses his foot on treadle O and raises latch N, thereby freeing arm L and the carrier held thereby to be tipped, allowing the bundles to fall to the ground.

The rear side of the carrier is open, and the rear edge of its bottom is formed of slats to permit the stubble to pass between and take the bundles with certainty and with less shock to the bundles than if said bottom ended above the stubble. This is to prevent shelling the grain out when very dry.

I provide the harvester with arms Q, rigidly fixed at their forward ends to the harvester-frame and extending along the engine, to be pivoted thereto at R, a point as far back as possible. Near the rear of the body of the harvester I connect said arms Q with the front end of the engine by means of chains S, attached to be wound upon an axle, T, which is journaled in the engine-frame for that purpose with a ratchet-wheel, U, a hand-lever, V, and a detent, W.

The hand-lever is hung by ears X, having elongated holes upon axle T, and the lower end of the handle is shaped to engage the ratchet-teeth going one way and to slide over them going the other way, its ear-holes permitting it to slide on the axle for that purpose.

The detent W is provided with an opposite arm shaped as a treadle for the driver to press on to disengage the detent. This hand-lever, ratchet-detent, and axle serve as a winch to raise and lower the harvester by.

To raise and lower the harvester, the driver works the hand-lever to and fro, each backward movement turning the ratchet a few teeth, which are held by the detent. The detent is shown as engaging a ratchet-wheel of its own; but it may be arranged to engage wheel U. To lower the harvester, the driver first holds to the lever, then he presses the detent with his foot and sets the shaft free to revolve by the weight of the harvester; but he resists its sudden descent by the hand-lever, letting it down by gradual stages. The harvester, once set to a given height, becomes a fixture of the engine, and only varies relatively thereto when the forward wheels of the engine suddenly descend into some depression, like a ditch, when the foward portion of the harvester would be pitched into the ground. Then the suspending-chains S, being flexible, will permit the forward part of the harvester to rise relatively to the engine. To cause it to so rise, I provide caster-rollers Y, near the front edge of the harvester, of sufficient height to prevent the sickle being pitched into the ground, but not high enough to run continually on the ground. These caster-rollers will be carried suspended from the harvester usually, and will perform no service in regular use as supporters of the harvester.

As the raising and lowering of the harvester changes the relation between the sickle and the engine which drives it, I have devised a special means for communicating motion between the two.

$a$ represents the crank-shaft which drives the sickle. This shaft is journaled in the harvester to rise and fall therewith. $b$ is a shaft journaled in a yoke, $c$, which is in turn journaled to the engine-frame upon or concentric with the pulley-shaft $d$. This pulley and shaft $d$ receive motion by a belt, $e$, directly from a drive-wheel, $f$, on the main shaft of the engine. This drive-wheel is connected with the main shaft by a friction-clutch, (not shown,) which is arranged, as usual, to turn the sickle-driving gear only while going ahead; but the drive-wheels on which the engine is supported are in no way connected to drive the harvester. The harvester-driver may be entirely independent of the engine-driver.

The shaft $b$ and its yoke $c$ swing at one end with the rise and fall of the harvester, and the shaft $b$ is connected with crank-shaft $a$ by a universal joint; and I prefer the link-joint shown, which not only permits motion to be transmitted between two shafts out of line, but it permits the shafts to move endwise while revolving.

The shaft $b$ is engaged permanently with the pulley-shaft $d$ by means of beveled gears $g$.

What I claim as my invention, and wish to secure by Letters Patent, is—

1. The combination, with a traction-engine and a harvester ahead thereof, of a pair of arms secured at their forward ends to the harvester, thence passing backward outside of the forward supporting-wheels of the engine and pivoted at their rear ends to the engine-frame, and vertically-adjustable supports connecting the said arms at points near their forward ends with the forward end of the engine, substantially as described, whereby the harvester may be carried directly in front of the engine and be raised or lowered without interfering with the running-gear thereof.

2. The combination, with a traction-engine and a harvester attached thereto and carried in front thereof, and an automatic rake and binder, of a bundle carrier and dropper hung to the harvester upon a rock-shaft having a crank-arm and a segmental plate attached thereto, and a latch having a treadle, as described, whereby the driver of the engine may permit the said dropper to tip and drop the bound sheaves at will, as set forth.

WILLIAM F. WEIRICK.

Witnesses:
W. X. STEVENS,
SOLON C. KEMON.